United States Patent [19]

Girrbach et al.

[11] Patent Number: 5,124,135
[45] Date of Patent: Jun. 23, 1992

[54] PROCESS FOR THE SELECTIVE ABSORPTION OF CHLORINE AND/OR BROMINE FROM $CO_2$-CONTAINING OFF-GASES WITH THE AID OF STEAM

[75] Inventors: Ulrich Girrbach, Frankfurt am Main; Edgar Härtl, Langen; Egon Malow, Hochheim, all of Fed. Rep. of Germany

[73] Assignee: Hoechst Aktiengesellschaft, Frankfurt am Main, Fed. Rep. of Germany

[21] Appl. No.: 784,675

[22] Filed: Oct. 28, 1991

Related U.S. Application Data

[63] Continuation of Ser. No. 546,102, Jun. 29, 1990, abandoned.

[30] Foreign Application Priority Data

Jul. 1, 1989 [DE] Fed. Rep. of Germany ....... 3921787

[51] Int. Cl.⁵ .............................. C01B 7/01; C01B 7/09
[52] U.S. Cl. .................................................... 423/241
[58] Field of Search ............... 423/241, 220, 221, 232; 55/71

[56] References Cited

U.S. PATENT DOCUMENTS

| | | | |
|---|---|---|---|
| 2,481,241 | 9/1949 | Rapson et al. | 423/241 |
| 3,854,901 | 12/1974 | Cowley | 55/71 |
| 3,962,404 | 6/1976 | Giammarco et al. | 423/232 |

FOREIGN PATENT DOCUMENTS

| | | | |
|---|---|---|---|
| 2413358 | 9/1975 | Fed. Rep. of Germany | |
| 2849498 | 5/1980 | Fed. Rep. of Germany | |
| 37-18452 | 12/1962 | Japan | 423/220 |
| 73452V/42 | 8/1972 | Japan | |

*Primary Examiner*—John Niebling
*Assistant Examiner*—Brian M. Bolam

[57] ABSTRACT

The invention provides a process for the selective absorption of chlorine and/or bromine from $CO_2$-containing off-gases. The off-gas must contain at least 1 mol of $SO_2$ per mol of $Cl_2$ and/or per mol of $Br_2$; if necessary sufficient $SO_2$ is added to the off-gas to give the above-mentioned relative amount. Chlorine and/or bromine is absorbed by mixing the off-gas with steam and then cooling the mixture until the steam condenses. An example of a suitable apparatus is a vertical tube having an internal cooling coil.

4 Claims, No Drawings

PROCESS FOR THE SELECTIVE ABSORPTION OF CHLORINE AND/OR BROMINE FROM $CO_2$-CONTAINING OFF-GASES WITH THE AID OF STEAM

This application is a continuation of our co-pending application Ser. No. 07/546,102, filed Jun. 29, 1990, now abandoned.

The combustion of chlorinated hydrocarbons gives, besides hydrogen chloride and $CO_2$, according to the DEACON equilibrium, also elemental chlorine. This chlorine is not allowed to be discharged into the environment and must consequently be removed to the greatest possible extent from the off-gas. In the Federal Republic of Germany, the chlorine concentration must be below 5 mg/$^3$.

The absorption of chlorine from gas streams has hitherto generally been carried out using sodium hydroxide solution with the formation of sodium hypochlorite:

$$Cl_2 + 2NaOH \rightarrow NaCl + NaOCl + H_2O$$

In the case of gas streams which besides chlorine contain only inert gas, an industrially usable product (NaOCl solution) is obtained from the absorbent. If the off-gas which is to be absorbed contains other alkali-soluble gases besides $Cl_2$, the identical procedure gives a solution of several salts which is virtually unusable. For example, $CO_2$ is also absorbed by sodium hydroxide solution with the formation of $NaHCO_3$:

$$NaOH + CO_2 \rightarrow NaHCO_3$$

According to the prior art, NaOCl is removed from these mixtures of salts by adding $Na_2SO_3$.

Minimization of the troublesome simultaneous absorption of $CO_2$ has already been given much attention, so that techniques are already known for specific applications.

A process described in DE-A-2,849,498 employs two absorption cycles operated using NaOH for absorbing $Cl_2$ to give NaCl and NaOCl. A portion of the resulting NaOCl is continually discharged and decomposed using $NaHSO_3$. However, the off-gas purified according to this process still contains about 10 ppm, i.e. about 30 mg/m$^3$, of chlorine.

The multi-stage countercurrent absorption of chlorine using sodium hydroxide solution, which has been described in U.S. Pat. No. 3,984,523, is suitable only for gas streams which are firstly highly loaded with chlorine and secondly contain $CO_2$ in a similar concentration to that of $Cl_2$. However, owing to the high absorption of $CO_2$ in alkali, this process is unsuitable for use with a 100-1,000-fold excess of $CO_2$ relative to $Cl_2$ in the off-gas. At high chlorine loadings in the off-gas, the $CO_2$ which has been absorbed in the last stage is driven out again by chlorine in the first stage, a procedure which is not possible at low chlorine loadings.

Furthermore, it is known from the Derwent Report 3452V/42, referring to Japanese Application 72/84607 (Publication No. 74/40,277) to absorb $Cl_2$ from $CO_2$-containing off-gases in a 3-stage process by first washing out the bulk of the $Cl_2$ with sea water in an absorption tower, then reacting the remaining $Cl_2$ with $SO_2$, and then washing again with water. In this process, the second washing is carried out using a jet scrubber.

Surprisingly, it has now been found that $Cl_2$ and/or $Br_2$ can be absorbed from a $CO_2$-containing off-gas with the aid of condensing steam if the off-gas contains at least mol of $SO_2$ per mol of $Cl_2$ and/or per mol of $Br_2$. If the off-gas does not originally contain such an amount of $SO_2$, sufficient $SO_2$ is added to the off-gas to comply with this requirement.

The present invention accordingly provides a process for the absorption of $Cl_2$ and/or $Br_2$ from $CO_2$-containing off-gas which contains at least 1 mol of $SO_2$ per mol of $Cl_2$ and/or per mol of $Br_2$, which comprises carrying out the absorption with the aid of condensing steam.

The invention also provides a process for the absorption of $Cl_2$ and/or $Br_2$ from $CO_2$-containing off-gas which contains less than 1 mol of $SO_2$ per mol of $Cl_2$ and/or per mol of $Br_2$, wherein sufficient $SO_2$ is added to the off-gas to give at least 1 mol of $SO_2$ per mol of $Cl_2$ and/or per mol of $Br_2$ and then the absorption is carried out with the aid of condensing steam.

1 mol of $SO_2$ per mol of $Cl_2$ and/or per mol of $Br_2$ here denotes 1 mol of $SO_2$ per mol of halogen which may be $Cl_2$ and/or $Br_2$.

$Cl_2$ and/or $Br_2$ are absorbed by mixing the off-gas, optionally after adding $SO_2$, with steam and then cooling the mixture until the steam condenses. The degree of absorption can be adjusted using the amount of steam and the intensity of cooling.

An example of a suitable apparatus for the absorption is a vertical tube having an internal cooling coil. The off-gas, optionally containing added $SO_2$, and (preferably slightly superheated) steam are introduced at the head of the tube. Cooling water is passed through the cooling coil, a long column of mist forming in which the absorption takes place. The condensed water droplets form drops which are collected at the foot of the tube and drawn off. Then further water is condensed out from the off-gas steam mixture by cooling the mixture to about 20° C. This can be carried out with the aid of a second condenser or of a conventional absorption column which is operated using the collected condensate from the upstream-connected condenser. After this, the off-gas is substantially free of $Cl_2$ or $Br_2$ while the $CO_2$ is not absorbed.

The process according to the invention is suitable in particular for $CO_2$-rich off-gases, even for those whose $CO_2$-content is 10 to 10s times as high as the $Cl_2$ content or $Br_2$ content.

The invention is explained by the example which follows.

EXAMPLE 1

An off-gas containing 24.8% by weight of $CO_2$, 75% by weight of $N_2$, 0.1% by weight of $Cl_2$ (=1,000 ppm) and 0.1% by weight of $SO_2$ (=1,000 ppm) was purified. The off-gas flowed through two condensers (tubes with internal cooling coils) connected in succession, the gas passing from top to bottom in each case.

The cooling coil of the first condenser carried thermostatically controlled water at a temperature of 70° C. The cooling coil of the second condenser carried thermostatically controlled water at a temperature of 15° C. The volume flow passed through the apparatus was 1.8 m$^3$/h. To this off-gas were added about 1,100 g/h of steam at a temperature of 100° C. at the head of the first condenser. The concentration of $Cl_2$ measured at the base of the second condenser was about 1 ppm of $Cl_2$ in the purified off-gas, the $SO_2$ concentration being less than 1 ppm.

The degree of absorption of $Cl_2$ was about 99.9%, and the degree of absorption of $SO_2$ was even higher.

We claim:

1. A process for the absorption of $Cl_2$ or $Br_2$, or mixtures thereof, from $CO_2$-containing an off-gas which contains at least 1 mol of $SO_2$ per mol of $Cl_2$ or per mol of $Br_2$, or mixtures thereof, which comprises mixing the off-gas with steam and cooling the mixture until the steam condenses to effect a contact of water droplets with the gas, and obtaining as a result a purified off-gas still containing $CO_2$ but containing no more than about 5 mg of $Cl_2$ or $Br_2$, or mixtures thereof, per $m^3$ purified off-gas.

2. The process as claimed in claim 1, wherein the steam is superheated.

3. A process for the absorption of $Cl_2$ of $Br_2$, or mixtures thereof, from $CO_2$-containing off-gas which contains less than 1 mol of $SO_2$ per mol of $Cl_2$ or $Br_2$, or mixtures thereof, wherein sufficient $SO_2$ is added to the off-gas to give at least 1 mol of $SO_2$ per mol of $Cl_2$ or per mol of $Br_2$, or mixtures thereof, mixing the $SO_2$-containing off-gas with steam and cooling the mixture until the steam condenses to effect a contact of water droplets with the gas, and obtaining as a result a purified off-gas still containing $CO_2$ but containing no more than about 5 mg of $Cl_2$ or $Br_2$, or mixtures thereof, per $m^3$ of purified off-gas.

4. The process as claimed in claim 3, wherein the steam is superheated.

* * * * *